United States Patent
von Willich

(10) Patent No.: US 6,840,260 B2
(45) Date of Patent: *Jan. 11, 2005

(54) METHOD OF MANUFACTURING A THROTTLE VALVE CONNECTION PIECE AND A HOUSING THEREFOR

(75) Inventor: Joachim von Willich, Selters (DE)

(73) Assignee: Siemens AG, München ( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 10/779,782

(22) Filed: Feb. 18, 2004

(65) Prior Publication Data

US 2004/0159816 A1 Aug. 19, 2004

Related U.S. Application Data

(63) Continuation of application No. PCT/DE02/03042, filed on Aug. 19, 2002.

(30) Foreign Application Priority Data

Aug. 23, 2001 (DE) .......................................... 101 40 409

(51) Int. Cl.$^7$ ................................................ F16K 1/22
(52) U.S. Cl. .................................... 137/15.25; 251/305
(58) Field of Search ...................... 137/15.25; 251/305, 251/306, 307, 308; 123/337; 264/328.8, 250, 255

(56) References Cited

U.S. PATENT DOCUMENTS 3,675,888 A * 7/1972 Scaramucci .................. 251/306

(List continued on next page.)

FOREIGN PATENT DOCUMENTS

DE     4135806 A1    5/1992

(List continued on next page.)

OTHER PUBLICATIONS

Derwent Abstract DE4429956A1; Feb. 29, 1996; Dell'Orto S.p.A., I–Mailand.

(List continued on next page.)

*Primary Examiner*—Eric Keasel
(74) *Attorney, Agent, or Firm*—Jacob Eisenberg; Siemens AG

(57) ABSTRACT

The present invention relates to a method for producing a housing of a valve connection piece and to a valve connection piece. The housing includes a throughflow opening wherein a valve is pivotably arranged around a pivoting axis extending in a perpendicular position with respect to the longitudinal extension of the throughflow opening. When in a closed position, the valve rests with the radially peripheral edge thereof in a beginning area of the valve on the inner wall of the throughflow opening. The beginning area of the valve extends from the resting area of the butterfly valve on the inner wall of the throughflow opening in the direction which the valve flap opens and has a circular cross section which is offset along the pivoted longitudinal axis of the throughflow opening. The inflow and outflow areas which are adjacent to the beginning area of the valve on the inflow and outflow side spread outwards in a conical manner. The inner wall of the throughflow opening has a non-machined injection moulding surface with a central separation edge which extends from the furthest point perpendicular to the pivoting axis of the transition between the end of the beginning area of the valve and the inflow area to the furthest point perpendicular to the pivoting axis of the transition between the beginning area of the valve and the outflow area and which is oriented in the direction of the longitudinal extension of the pivoting axis of the butterfly valve.

26 Claims, 3 Drawing Sheets

U.S. PATENT DOCUMENTS

| | | | | |
|---|---|---|---|---|
| 4,391,247 A | * | 7/1983 | Shioyama et al. | 123/403 |
| 4,474,150 A | * | 10/1984 | Foley et al. | 123/337 |
| 4,572,478 A | * | 2/1986 | Vogler et al. | 251/305 |
| 5,304,336 A | * | 4/1994 | Karlsson et al. | 264/255 |
| 5,315,975 A | | 5/1994 | Hattori et al. | |
| 5,374,031 A | | 12/1994 | Semence et al. | |
| 5,465,696 A | * | 11/1995 | Gmelin | 251/305 |
| 5,575,256 A | * | 11/1996 | Peters et al. | 123/337 |
| 6,047,950 A | * | 4/2000 | Pontoppidan et al. | 251/305 |
| 6,138,988 A | * | 10/2000 | Bouvet et al. | 251/306 |
| 6,328,281 B1 | * | 12/2001 | Jung | 251/305 |

FOREIGN PATENT DOCUMENTS

| | | |
|---|---|---|
| DE | 4334180 A1 | 4/1995 |
| DE | 4429956 A1 | 2/1996 |
| DE | 69300671 T2 | 3/1996 |
| DE | 19615438 A1 | 1/1997 |
| DE | 19728564 A1 | 1/1999 |
| DE | 69604084 T2 | 4/2000 |
| WO | WO96/35866 | 11/1996 |
| WO | WO97/04259 | 2/1997 |

OTHER PUBLICATIONS

Derwent Abstract DE19728564A1; Jan. 28, 1999; Mannesmann VDO AG, D–60388 Frankfurt.

Derwent Abstract DE4334180A1; Apr. 13, 1995; Robert Bosch GmbH; D–70469 Stuttgart.

Derwent Abstract DE69300671T2; Mar. 21, 1996; Magneti Marelli; F–Nanterre.

Derwent Abstract DE19615438A1; Jan. 23, 1997; Filterwerk Mann & Hummel GmbH; D–71638 Ludwigsburg.

Derwent Abstract DE4135806A1; May. 7, 1992; Weber S.r.I., I–Turin.

Derwent Abstract DE69604084T2; Apr. 13, 2000; Magneti Marelli, F–Nanterre.

* cited by examiner

METHOD OF MANUFACTURING A THROTTLE VALVE CONNECTION PIECE AND A HOUSING THEREFOR

CROSS REFERENCE TO RELATED APPLICATIONS

The present application is a continuation of international application PCT/DE02/03042, filed 19 Aug. 2002 and further claims priority to German patent application 10140409.3, filed 23 Aug. 2001, the both of which are herein incorporated by reference.

BACKGROUND OF THE INVENTION

The present invention relates to a method for manufacturing a housing, or an insertion part for a housing, of a throttle valve connection piece. The housing comprises a throughflow opening in which a throttle or butterfly valve opens by pivoting about a pivot axis. The pivot axis extends transversely with respect to a longitudinal axis of the throughflow opening. The valve includes radial edges at its outer circumference. In a closed position, the valve, being in a throttle starting region, abuts an inner wall of a starting region, of the opening, at an abutment region. The throttle starting region, which extends from the abutment region of the butterfly valve and along the inner wall of the throughflow opening in the direction of opening of the valve, may define a substantially spherical cap or circular cross section. The throttle starting region is displaced along a pivoted longitudinal axis of the throughflow opening. The inflow and outflow regions which adjoin the end of the throttle starting region on the inflow side and outflow side are formed so as to be cylindrical or so as to extend conically. The present invention further relates to a valve connection piece having a housing or insertion part of a housing which is manufactured according to the present method.

With such housings or insertion pieces for housings it is known to manufacture at least the throttle starting region in the direction of opening of the valve by means of metal-removing processing, owing to its complicated spherical cap-like or pivoted design. The spherical cap-like or pivoted design of the throttle starting region has the function of allowing the opening cross section which is cleared by the valve, as it opens out of the closed position, to increase only slowly in the throttle starting region, in order to permit sensitivity with respect to the throughflow of air in this region.

The method of manufacture of these known housings and insertion parts is very complex and does not make it possible to manufacture the housing or the insertion part from plastic.

WO-A-97/04259 has disclosed a method for manufacturing a housing or an insertion part for a housing of a butterfly valve connection piece, and a butterfly valve connection piece in which a core which is composed of four core parts is arranged in an injection molding mold and is encapsulated by means of injection molding. In each case, two core parts abutting one against the other with their end surfaces which face one another form a core separating plane at their adjoining end surfaces, the core separating planes of the two core part pairs extending in different planes. The two core part pairs are axially offset with respect to one another in such a way that steps which are set back radially are formed on the wall of the throughflow opening, with which steps the butterfly valve is in abutment in its closed position. At the junction between the wall of the throughflow opening and the radially set-back step a core separating burr is produced. Air eddies are generated in the vicinity of the butterfly valve both by the core separating burr and by the radially set-back steps with the result that the sensitivity with respect to the throughflow of air at the start of the opening of the butterfly valve is influenced in a disruptive fashion.

SUMMARY OF THE INVENTION

An object of the invention is therefore to provide a method for manufacturing a housing or an insertion part as well as a throttle valve connection piece of the type mentioned above in which only a relatively small number of manufacturing steps are necessary, and in the case of the valve connection piece, the sensitivity of the through-flow of air is not adversely affected when the valve begins to open.

This and other objects are achieved according to the invention by a method wherein the core is separated, at a core separating plane, into a first core part and a second core part. The core parts are placed in abutment and encapsulated by injection molding. Accordingly, the core separating plane extends approximately from the point on the junction, between the end of the throttle starting region and the inflow region which is furthest away at a right angle to the pivot axis, to the point on the junction, between the end of the throttle starting region and the outflow region which is furthest away at a right angle to the pivot axis. The core separating plane is orientated so as to correspond to the longitudinal extent of the pivot axis of the valve.

The present method permits the housing or the insertion part to be manufactured without the need for any other metal-removing post-processing of the throughflow opening itself in its throttle starting region. The form of the throughflow opening and the surface of its inner wall have already been definitively produced by means of the injection molding operation.

The specific position of the core separating plane avoids the situation in which undercuts which would prevent removal of the core from the mold are produced. Furthermore, the core separating burr is produced at a point outside the abutment region of the butterfly valve against the inner wall of the throughflow opening and thus cannot adversely effect the satisfactory closing of the butterfly valve.

The core may be encapsulated, via injection molding, with a lightweight metal, such as aluminum, without conventional metal-removing post-processing being subsequently necessary.

If the core is encapsulated by means of injection molding using a plastic, a housing or insertion part with a throttle starting region having a complicated form may now be manufactured. Here, the core is preferably encapsulated by means of injection molding using a thermoplastic or a duroplastic.

The present connection piece may be produced with a relatively small number of manufacturing steps. This is possible because the present connection piece comprises a straightforward design. In the present housing, a throughflow opening threw the housing is formed. The throughflow has three regions: inflow and outflow regions separated (and opened to one another so as to facilitate through-flow) by a valve starting region. The valve is pivotably mounted on a pivot axis in the valve starting region. The pivot axis extends in a transverse direction to the opening central longitudinal axis or pivoted longitudinal axis of the opening. The valve pivots between an open and a closed position. In the closed position, the valve abuts the abutment region, of the starting region, with its ends. The valve ends are circumferential and radial. The starting region, like the inflow and outflow regions, is comprised of circular formed inner walls of the housing. The starting region defines the form of a spherical cap or comprises an approximately circular cross section which is displaced along the longitudinal axis.

The inflow and outflow regions join the starting region at its inflow and outflow sides respectively. The inflow and outflow regions define cylindrical shapes in a direction away from the starting region, within the opening.

The inner wall of the throughflow opening comprises, at least in the throttle starting region, a mechanically unprocessed injection molded surface with a core separating burr which extends approximately from a point on the junction (between the end of the throttle starting region and the inflow region and which is furthest away at a right angle to the pivot axis to that point) between the end of the throttle starting region and the outflow region (which is furthest away at a right angle to the pivot axis) and the burr is orientated so as to correspond to the longitudinal extent of the pivot axis of the valve.

Here, sensitive, undisruptive opening of the valve is possible at the start of the opening movement if the valve abuts, in its closed position with its radially circumferential edge in the throttle starting region against the inner wall of the throughflow opening, at a distance from the junction between the end of the throttle starting region and the inflow region, and at a distance from the junction between the end of the throttle starting region and the outflow region, so that the sensitivity with respect to the throughflow of air at the start of the opening of the valve is not disruptively influenced by air eddies, produced at the core separating burr, in the vicinity of the valve.

BRIEF DESCRIPTION OF THE SEVERAL VIEWS OF THE DRAWINGS

Exemplary embodiments of the invention are illustrated in the drawings and will be described in more detail below, wherein.

DETAILED DESCRIPTION OF THE INVENTION

The present invention will now be discussed with respect to the appended figures wherein like numerals refer to at least equivelant parts.

Figure 1:
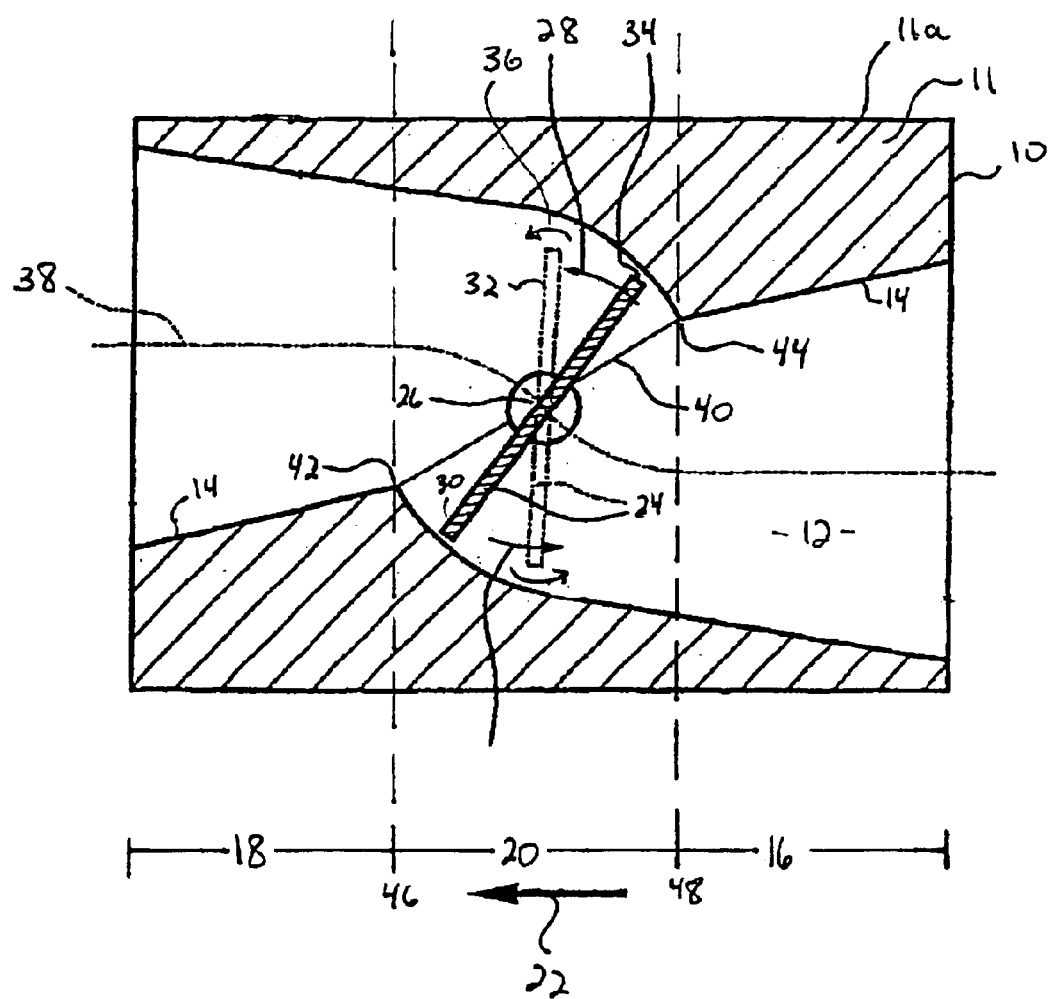
FIG. 1 depicts a cross section of the present connection piece.

FIG. 1 depicts a cross section of the present connection piece. As shown, the present piece comprises a housing 10 having wall 11 defining an throughflow opening 12 therethrough. Given the cross section, the wall 11 is depicted as a top and bottom wall (11a and 11b). The housing may be manufactured from aluminum or plastic by means of injection molding.

The opening 12 runs through the housing along a central longitudinal axis (represented by dashed line 38). The longitudinal axis 38 may define a substantial mid-line of the opening. The opening 12 has a mechanically unprocessed injection molded surface 14 which is defined by the inner walls (11a and 11b) of housing 10.

Opening 12 includes three regions: an inflow region 16; outflow region 18 and a throttle valve starting region 20 separating, but still facilitating flow between, the inflow and outflow regions. An approximate demarkation between the regions is depicted as dashed lines 48 (for the inflow start region border) and 46 (for the start outflow border). A burr 40 runs the length between the two points. The direction of flow is indicated by arrow 22. The burr is at a substantial right angle to the center line. The inflow region 16 tapers conically in the direction of flow 22. Conversely, the outflow region widens conically in the direction of flow 22.

The starting region is defined by a first point 44 on the inflow start region border and a second point 42 on the start outflow region border. The two points are separated by a width having a distance substantially equal to a valve 24 (discussed in more detail below). The two points are depicted sitting on burr 40. Running along the length of the start region, from the first point to the outflow border and from the second point to the inflow border, the width of the start region tapers off to a larger distance. The tapering effect is further illustrated by the curvature in dashed line 38 representing the longitudinal axis and center line.

In the starting region 20, a valve 24 is pivotably mounted on a pivot axis 26. Pivot axis 26 runs approximately transverse to longitudinal axis 38. The valve is a throttle valve and may be a butterfly valve. The valve moves in the direction (indicated by arrow) 28 from a substantially closed position 30 (shown as a solid valve outline) to a substantially open 32 (shown as dashed line valve outline) position. The pivot comprises radial and circumferential ends 34 which, in the closed position, substantially abut the walls of the starting region. The location where the valve abutt the inner wall of the start region is the abuttment region (unlabeled for clarity). The ends and walls are depicted as being slightly separated for clarity. The actual closed position would entail the valve running between the first and second points (44 and 42). When the valve ends abut the walls, through flow is halted. Likewise, the open position 32 is defined by the ends not abutting the walls. Here, in the open position, flow may skirt past the valve between the ends and starting region walls (arrow 36).

Figure 2:
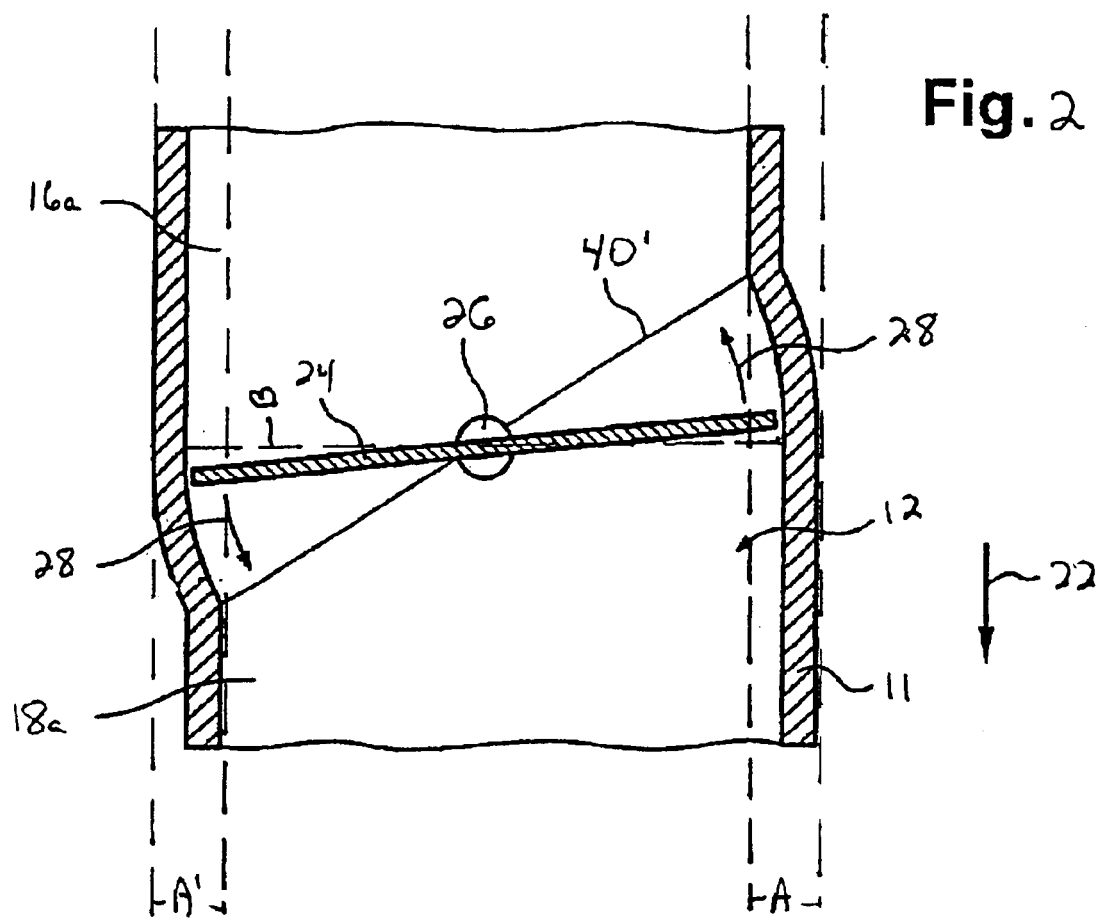
FIG. 2 depicts a second embodiment of the present invention.

FIG. 2 depicts a second embodiment of the present invention. FIG. 2 depicts a housing cross section with the inflow region 16a above the starting region 20a itself above the throughflow region 18a. The direction of flow is indicated by arrow 22. The second embodiment differs from the first in at least the following features. The inflow and outflow regions comprise substantially parallel walls in the direction away from the start region. Additionally, the regions walls are offset to one another by a preselect distance A and A'. The two distances may have substantially similar values. Observing in a direction of flow 22 (top to bottom), in the start region, initially the right side wall inclines at a first angle away from the left side wall, a total distance of A. At certain distance later, the left side wall includes at a second angle in the direction of the right side wall until it again becomes substantially parallel with the left side wall. The point of initial inclination for the left side wall and the point of final inclination for the right side wall mark the boundries of the start region. Additionally, these points are connected by a burr 40'. Accordingly, the inflow and outflow regions assume a cylindrical shape.

In operation, the valve 24 can be made to pivot or move, about axis 26, from a closed to an open position, in the direction of arrows 28. The valve 24 is depicted in between these two positions. In the closed position, the valve is positioned substantially perpendicular with the start region walls, the valve ends being flush with the walls. In the open position, gaps between ends and walls facilitate throughflow. The closed position is facilitated by the B dashed line being the narrowest width point or cross section (in the direction of the valve) between the start region walls.

Figure 3:
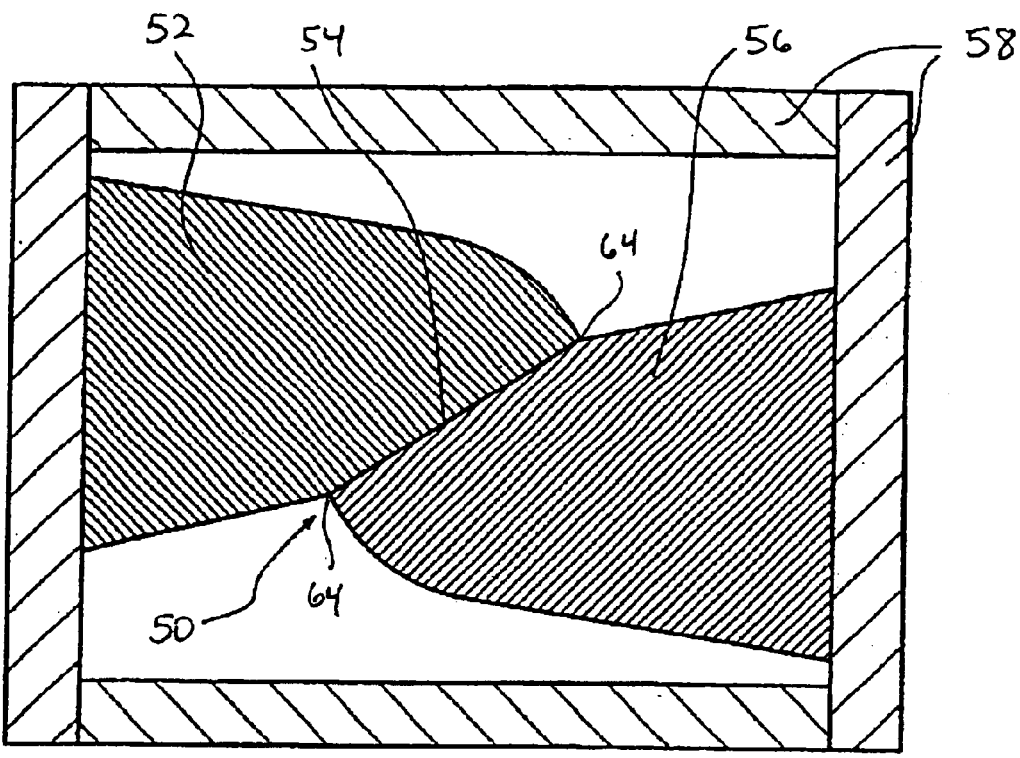
FIGS. 3 and 4 depict a method by which the aforementioned embodiments are made.
Figure 4:
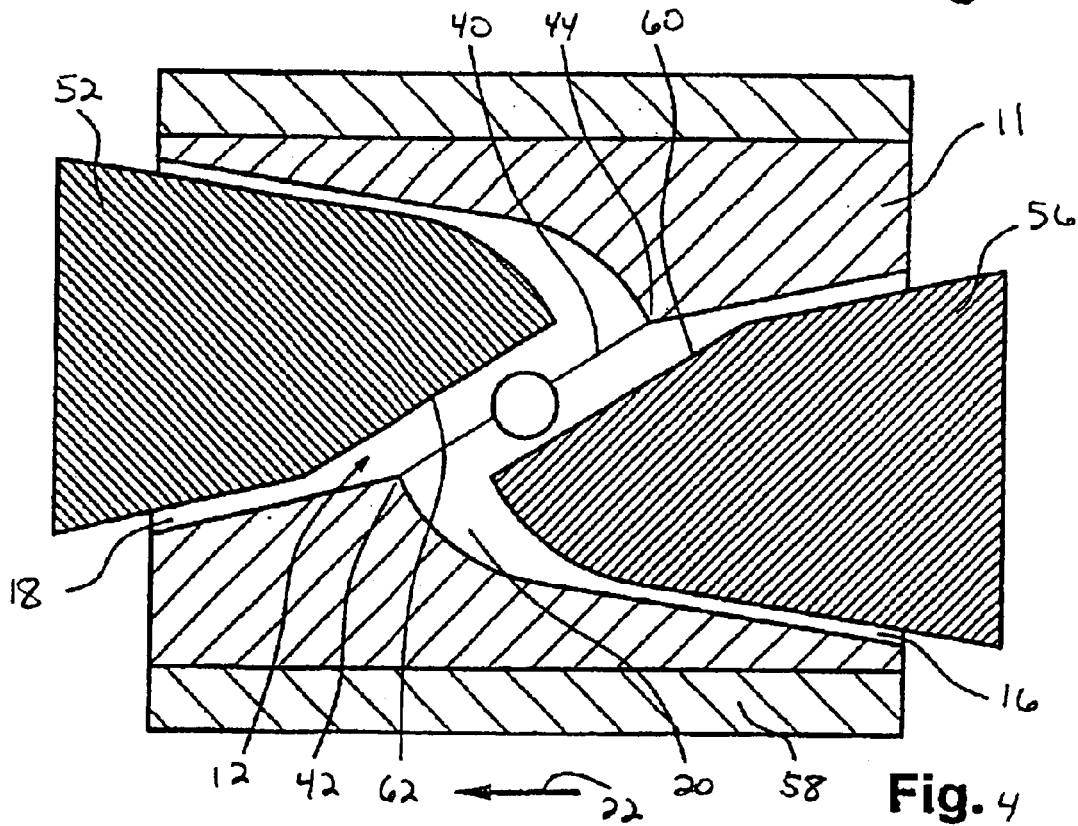

FIGS. 3 and 4, depict a method by which the aforementioned embodiments are made. The figures depict a pair of mating cores which come together to form the throughflow opening 12. As shown, the cores define substantially conical shaped bodies having a pinnacle point and a widening body in a direction away from the pinnacle point, the widening body defining a semicircle along one wall and at least said facing surface opposite said semicircle along another wall. In an alternate embodiment, the regions may define cylindrical shapes. A first core part 52 and a second core part 56 of a core 50 are arranged in an external injection molding mold 58. The core parts 52 and 56 abut one another with their end faces 60 and 62 facing one another. The end surfaces 60 and 62, which bear one against the other, form a core separating plane 40 when the core 50 is inserted into the injection molding mold 58. An encapsulant used with the injection molding may be one of a plastic or a metal. For a metal, the encapsulant may be aluminum. For a plastic, the encapsulant may comprise a thermoplastic or a duroplastic.

The core separating planes 54 extend from point 44 to point 42, passing through longitudinal axis 38 and pivot axis 26 (see FIG. 1). The core separating plane 54 is oriented so as to correspond to the longitudinal extent of the pivot axis 26 of valve 24. In otherwords, the points represent the pinnacles of cylinder or cone shapes defined by the inflow and outflow regions in a direction away from the start region.

In FIG. 4, the core parts 52 and 56 have already been pulled axially apart from one another, by a distance, after an injection molding process, so that a core separating burr 40, which has been produced along the core separating plane 54, is visible on the injection molded housing 1.

As is apparent in FIG. 1, this core separating burr 40 is located at a distance from the valve 24 in its closed position so that the satisfactory closing of the valve 24 is not impeded by the core separating burr 40.

I claim:

1. A method of making a throttle valve connection piece housing, said housing comprising a throughflow opening in which a throttle valve is pivotably mounted on a pivot axis, said pivot axis running substantially transverse to a center line of said opening, comprising the steps of:

aligning facing surfaces of a first and second circular core, said first and second core defining substantially conical shaped bodies having a pinnacle point and a widening body in a direct circuit away from said point, said widening body defining a semicircle along one wall and at least said facing surface opposite said semicircle along another wall;

mating said first and second core to form a continuous core such that a plane formed by said mated facing surfaces runs through said center line at a substantial right angle and through said pivot axis;

placing said continuous core in an external mold, encapsulating said continuous core with an encapsulant; and axially separating said first and second core thereby producing an opening within said encapsulant, said opening comprising an inflow region running into a valve starting region running into an outflow region.

2. The method according to claim 1, wherein said plane is substantially similar in length to said valve.

3. The method according to claim 1, wherein each of said pinnacles defines a point on a border between said inflow and stan regions and said outflow and start regions.

4. The method according to claim 1, wherein said housing is modular.

5. The method according to claim 1, wherein said valve is a butterfly valve.

6. The method according to claim 1, wherein said step of encapsulating further comprises the step of encapsulating said core by injection molding.

7. The method according to claim 6, wherein said encapsulant is a metal.

8. The method according to claim 7, wherein said metal is aluminum.

9. The method according to claim 6, wherein said encapsulant is a plastic.

10. The method according to claim 9, wherein said plastic is one of a thermoplastic and a duroplastic.

11. A method for making a throttle valve connection piece housing, said housing comprising a through opening in which a throttle valve is pivotably mounted on a pivot axis, said pivot axis running substantially transverse to a centerline of said opening, comprising the steps of:

aligning facing surfaces of a first and second circular core, said first and second core defining substantially cylindrical shaped bodies having a pinnacle point and a widening body in a direction away from said point, said widening body defining a semicircle along one wall and at least said facing surface opposite said semicircle along another wall;

mating said first and second core to form a continuous core such that a plane formed by said mated facing surfaces runs through said center line at a substantial right angle and through said pivot axis;

placing said continuous core in an external mold, encapsulating said continuous core with an encapsulant, and axially separating said first and second core thereby producing an opening within said encapsulant, said opening comprising an inflow region running into a valve starting region running into an outflow region.

12. The method according to claim 11, wherein said piano is substantially similar in length to said valve.

13. The method according to claim 11, wherein each of said pinnacles defines a border of said valve starting region.

14. The method according to claim 11, wherein said housing is modular.

15. The method according to claim 11, wherein said valve is a butterfly valve.

16. The method according to claim 11, wherein said step of encapsulating further comprises the step of encapsulating said core by injection molding.

17. The method according to claim 16, wherein said encapsulant is a metal.

18. The method according to claim 17, wherein said metal is aluminum.

19. The method according to claim 16, wherein said encapsulant is a plastic.

20. The method according to claim 19, wherein said plastic is one of a thermoplastic and a duroplastic.

21. A housing for throttle valve connection piece, comprising:

walls defining an circular interior throughflow opening centered about a longitudinal axis, said opening comprising an inflow, outflow and valve starting regions, said regions arranged such that said inflow and outflow regions border opposing sides of said valve start region;

a valve pivotably mounted on a pivot axis, said valve and pivot axis located within said valve starting region, said pivot axis extending substantially transverse to said longitudinal axis and located substantially on said longitudinal axis, and said valve mounted so as to pivot between a closed position, wherein ends of said valve contact walls of said valve start region, and an open position wherein a gap is present between said ends and said wall, said gap facilitating said throughflow, end points positioned on said borders as right angles to said longitudinal axis, said end points defining a pinnacle of an approximately conical shape defined by said inflow and outflow regions, said points located on opposing inner wall surfaces coaxial to an axis running through said longitudinal and pivot axis, and said valve start region comprising opposing walls defining a semicircular form from a point to an adjacent border and being offset to a longitudinal axis of said inflow and outflow region.

22. The housing according to claim 21, wherein said start region comprises a mechanically unprocessed injection molded surface with a core separating burr running between said points and through said pivot axis.

23. The housing according to claim 21, wherein said walls comprise an encapsulant.

24. The housing according to claim 23, wherein said encapsulant is one of a plastic and a metal.

25. The housing according to claim 21, wherein said valve is a throttle valve.

26. The housing according to claim 25, wherein said valve is a butterfly valve.

* * * * *